United States Patent

[11] 3,617,324

[72] Inventor Richard E. Thomas
Chicago, Ill.
[21] Appl. No. 768,372
[22] Filed Oct. 17, 1968
[45] Patented Nov. 2, 1971
[73] Assignee A. B. Dick Company
Niles, Ill.
The portion of the term of the patent subsequent to June 24, 1986, has been disclaimed.

[54] METHOD FOR FORMING A CONCEALED IMAGE BY SUBLIMINATION
4 Claims, 6 Drawing Figs.

[52] U.S. Cl.................................................... 117/1.7,
35/9 R, 101/469, 101/470, 101/471, 117/36.7,
117/37 R, 250/65 T
[51] Int. Cl.................................................... B41m 5/12
[50] Field of Search.......................................... 117/1.7,
36.2, 36.7, 37; 35/9; 101/469, 470, 426, 426 CR;
250/65 T

[56] References Cited
UNITED STATES PATENTS
2,993,805  7/1961  Kay.............................. 117/62
3,210,544  10/1965 Marx et al...................... 250/65
3,262,386  7/1966  Gordon......................... 101/149.4
3,360,367  12/1967 Stricklin........................ 117/1.7 X
3,363,338  1/1968  Skinner et al................. 35/9 X
3,418,468  12/1968 Marx et al...................... 250/65
3,451,143  6/1969  Thomas et al.................. 35/9
3,454,764  7/1969  Collier et al................... 250/65

OTHER REFERENCES
Prater; M. P., " Superthreshold Impact Heating Printing" IBM Technical Disclosure Bulletin vol. 1 No. 6, pg. 4 April 1959

Primary Examiner—William D. Martin
Assistant Examiner—Edward J. Cabic
Attorney—McDougall, Hersh, Scott & Ladd ABSTRACT: A teaching process which makes use of a copy sheet having a visible image, a master sheet having a visible image keyed to the visible image on the copy sheet and a coating associated with the imaged master containing an invisible heat volatilizable material capable of reaction with a developer component for development of color which includes positioning the copy sheet with its printed side in surface contact with the coating and radiating the master sheet to develop a corresponding heat pattern to cause volatilization of the material in the corresponding areas of the coating for transfer to provide a latent image on the corresponding areas of the copy sheet, and in which the latent image is developed by wetting with the development material.

METHOD FOR FORMING A CONCEALED IMAGE BY SUBLIMATION

This invention relates to a sheet having a visible image in the form of an examination sheet, instructional material, or teaching device, and an invisible or latent image keyed to the visible image for development of the invisible or latent image by a special development material in the form of a liquid, pencil, crayon and the like containing one or more components for reaction with the invisible material present in the latent image for visual development thereof.

Concealed images keyed to visual instructional material of the type described have found considerable acceptance in the field of examination, self-instructional material, and other devices used in the educational field. Reference may be made to the copending application Ser. No. 574,743, filed Aug. 24, 1966, now U.S. Pat. No. 3,451,143, and entitled "Spirit Duplication with Visible and Concealed Images" for a fuller description of one technique for preparation of copy of the type described by a spirit duplicating process and for the application and use of the same.

It is an object of this invention to produce and to provide a method for producing copy of the type described containing the combination of visible images and invisible or concealed images keyed to the visible image and to a new and novel means and elements for use in the preparation of same.

These and other objects and advantages of this invention will hereinafter appear and for purposes of illustration, but not of limitation, an embodiment of the invention is shown in the accompanying drawing in which.

In accordance with the concept of this invention, the invisible or concealed image is transferred as a latent image keyed to the visible image on a copy sheet by the process of sublimation or volatilization of an invisible image forming material directly from a coated master to the printed copy sheet to form the latent invisible image thereon. This enables a number of unique ramifications from the standpoint of flexibility in use as well as in application. For purposes of illustration, the invention will be described with reference to its practice in examinations, it being understood that the various and many other uses will be immediately apparent from the description hereof and from the description of the aforementioned copending application.

It has been found that there are a number of materials which are capable of transfer from one surface to another and which are invisible in their state of transfer until developed by reaction with another component for color formation. The above defines the essential characteristics of the material required to be present in the transfer coating to form the invisible concealed image on the copy sheet: namely, a colorless or invisible compound or component, volatility of the compound at relatively low temperature of the order of less than 1,000° F. and preferably less than 500° F. but above 150° F., and capable of color development upon reaction of the compound with another component. Representative are such materials as salicylic acid, vanillin, benzoic acid and antipyrine. Such materials are capable of being volatilized in response to a heat pattern generated upon infrared radiation of an original containing an infrared ray absorbing—heat generating image on one or the other side of the coated master sheet. Each of the materials described as capable of use in forming the latent concealed image can immediately be developed by reaction with ferric chloride, for example.

The invisible material used in the formation of the latent concealed image can be embodied as a coating on the imaged master or on a separate transfer sheet adapted to be used with the imaged master.

The ferric chloride or other development component can be embodied in the developing material, preferably in solution in a fluid with which the entire copy sheet can be wet for image development or as a component of an ink, pencil or other marking material.

Figure 1:
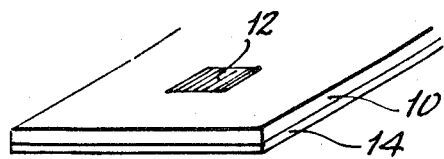
FIG. 1 is a perspective view partially in section of an imaged original embodying the feature of this invention.
Figure 2:
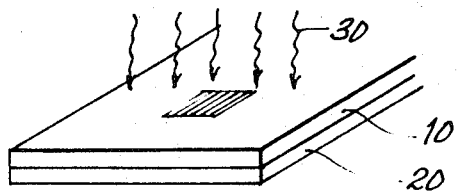
FIG. 2 is a perspective elevational view partially in section of the original in position for imaging a copy sheet.
Figure 3:
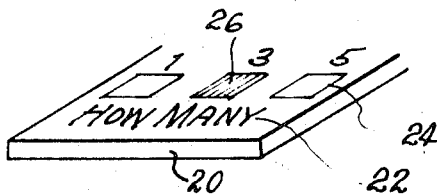
FIG. 3 is a perspective view partially in section of the imaged copy sheet.
Figure 4:
FIG. 4 is a perspective view partially in section of the copy sheet shown in FIG. 3 with the portion selected by the user being marked.
Figure 5:
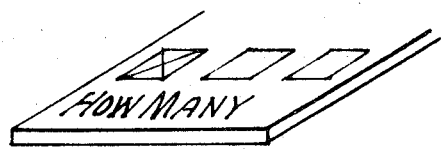
FIG. 5 is a perspective view partially in section similar to that of FIGS. 3 and 4 with the concealed image developed.
Figure 6:
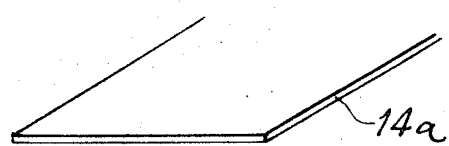
FIG. 6 is a perspective view partially in section of a transfer sheet which may be used in the practice of this invention.

Having described the basic concepts of the invention, illustration will now be made by way of the following example:

FIG. 1 illustrates a master sheet 10 having a box 12 in the form of an original image of infrared ray absorbing material. The backside of the sheet is provided with a coating 14 of salicylic acid, or vanillin, or benzoic acid, or antipyrine, applied by roller coating, spray coating or the like coating technique from a dilute solution corresponding to about 1–10 percent by weight of the invisible latent image forming material.

Instead of supplying the overall layer 14, containing the latent imaging material, on the backside of the imaged master 10, it may be embodied within or on a thin absorbent transfer sheet 14$^a$.

The copy sheet 20 is provided with the information or examination questions 22 in the form of a visible image with a number of boxes 24 keyed to the question for selection of one as the answer to be given by the pupil for the particular question.

The box which represents the proper answer is provided with the invisible, concealed imaging material by positioning the copy sheet 20 with the imaged side in surface contact with the transfer coating 14 or 14$^a$, and the master is radiated with radiations 30 rich in infrared whereby the radiations are absorbed by the imaged portion of the master to generate a heat pattern sufficient to cause vaporization of latent imaging material in the area corresponding to the heat pattern for transfer to the appropriate box 26 on the copy sheet. Thus, the box which represents the correct answer is provided with the latent imaging material but its presence is not observed by the pupil taking the examination.

The pupil selects one of the boxes as his answer and marks the box with a conventional pencil, ink or marking material to inscribe a visible mark 28 in the box selected for the answer.

For grading and/or for permanent record which can be returned to the pupil, the copy sheet is wet overall with a developing liquid, such as a dilute aqueous solution of ferric chloride (0.1–2 percent by weight). This will react with the latent imaging material in the box 26 for visual development of the box representing the correct answer. If it coincides with the answer marked by the student, this will immediately be made visible for use by the teacher in grading and as a permanent record for the student. If the student has marked another box, this will also immediately be made visible for grading and record purposes.

Instead of development by the teacher with a developing solution, the instrument with which the sheet is marked by the student can be both colored and contain the ferric chloride or other developing material immediately to indicate to the student when he has selected the correct answer and to indicate to the teacher when the student has first selected the desired answer or an answer other than the correct answer.

It will be understood that instead of effecting volatilization for transfer of invisible imaging material from the transfer coating to the copy sheet by way of infrared radiation of an original, heat patterns keyed to the copy sheet and otherwise generated as by means of a die plate or template may be used to effect volatilization for transfer of the concealed imaging material to the copy sheet.

It will be understood that other changes may be made in the details of construction, arrangement and operation without departing from the spirit of the invention, especially as defined in the following claims.

1. In a copy making process in which use is made of a copy sheet containing a visible image on one surface thereof and a latent invisible image containing a material capable of visual development with a developing material and subsequently developing the latent invisible image with a developing material, the steps of positioning the surface of the copy sheet having the visible image thereon in surface contact with a layer on one side of a master sheet containing an invisible material which is heat volatilizable at a temperature above 150° F. and which is capable of reaction with the developing material for the development of a visual image, said master sheet containing a radiation absorbing heat-generating visible image keyed to the visible image on the copy sheet, radiating the master sheet with radiations which are absorbed by the visible image thereon to develop a corresponding heat pattern in the master sheet which transfers to the layer to cause volatilization of said material in the corresponding areas of the layer for transfer to provide a latent concealed image in the corresponding areas of the copy sheet.

2. The process as claimed in claim 1 in which the layer is a transfer coating on the backside of the imaged master.

3. The process as claimed in claim 1 in which the transfer coating is present in a sheet separate and apart from the master and in which the transfer sheet and master are positioned together on the copy sheet for transfer of the invisible image with the transfer sheet between the imaged surface of the copy sheet and the imaged master.

4. In a copy making process in which use is made of a copy sheet containing a visible image on one surface thereof and a latent invisible image containing a material capable of visual development with a developing material and subsequently developing the latent image with the developing material, the steps of positioning the surface of the copy sheet having the visible image in surface contact with a layer on one side of a master sheet containing an invisible material which is heat volatilizable at a temperature above 150° F. and which is capable of reaction with the developing material for the development of a visual image, applying a heat pattern defining the invisible image to the surface of the master sheet keyed to the copy sheet which causes volatilization of said material from the corresponding areas of the layer for transfer from the master sheet to the copy sheet to provide a latent concealed image in the corresponding areas of the copy sheet.

* * * * *